UNITED STATES PATENT OFFICE.

CLARENCE T. DENEGRE, OF NEW ORLEANS, LOUISIANA, ASSIGNOR OF ONE-HALF TO CHARLES DENEGRE, OF BIRMINGHAM, ALABAMA.

BAKED-ENAMEL-PAINT REMOVER.

1,204,851.          Specification of Letters Patent.      Patented Nov. 14, 1916.

No Drawing.      Application filed April 19, 1915.   Serial No. 22,313.

*To all whom it may concern:*

Be it known that I, CLARENCE T. DENEGRE, a citizen of the United States of America, residing at New Orleans, in the parish of Orleans and State of Louisiana, have invented certain new and useful Improvements in Baked-Enamel-Paint Removers, of which the following is a specification.

My invention relates to a novel compound for removing baked enamel paint.

My object is to produce a compound which, when applied to baked enamel paint, either by the immersion of the enameled article in the compound or the coating of the enameled surface with the compound, will penetrate the hard glazed surface and loosen it so that the enamel can be brushed or peeled off without manual labor. Baked enamel paint will resist all the standard paint removers now on the market and it is unaffected by the strongest acids. It is now impossible to remove enamel, especially when baked under high temperatures, except by chipping it off which is extremely tedious and expensive. The trade has long sought a compound which would remove baked enamel paint in the same manner that paint can now be removed by the commercial paint removers. My experiments have been conducted to this end and I have found that aqua ammonia, benzol and wood alcohol, when combined within certain proportional limits will accomplish the result in view. I am well aware that these several component elements have been used separately and in part jointly in various paint removers, but such removers will not affect baked enamel paint. I therefore base the claim for my present invention on the fact that by certain combinations of said elements I have produced a novel and exceedingly useful commercial article.

I have found the best results are obtained from my compound when it is composed of the following elements, or their equivalents, in the following proportions, to-wit:—To each gallon of liquid remover, 40 oz. of aqua ammonia of 26 degrees, 40 oz. of benzol, 40 oz. of wood alcohol, and 8 oz. of paraffin wax. If it is not desired to use the wax, the other three ingredients are proportionately increased.

The mixing of the composition is as follows: I take the benzol and put it into a container, the wax is melted and poured in melted condition into the container with the benzol, then the alcohol is added, and finally the ammonia, after which the composition is stirred or shaken until it becomes thoroughly mixed. I have used ammonia up to 32 degrees but have found that commercially satisfactory results are obtained from the 26 degree ammonia. Wood alcohol, either refined or semi-refined, can be used. Other waxy bodies miscible in the benzol can be substituted for the paraffin wax, but the latter is preferred and I have found that the proportion of 8 oz. to the gallon of compound will give a mixture practically free from lumps which is most satisfactory, but any percentage of the wax which will hold the solution on inclined or inverted surfaces and prevent its rapid evaporation will serve my purpose.

In using my improved compound to remove enamel, I have found that where the enamel has been baked at 400° F. and over, the best and quickest results are obtained where the article is submerged in the solution and allowed to remain from four to twenty-four hours, depending on the number of coats and since, under such conditions of use it is not essential that the solution should contain wax as the evaporation can be prevented by treating the article in a closed vessel, there is no necessity for giving to the solution an anti-evaporative body to hold it to the work. For other grades of enamel, the composition can be applied by brush or in any other suitable manner to coat the enamel surface and the wax will hold the active elements of the solution in contact with the enamel and retard the evaporation of the remover until the enamel is loosened sufficiently to be easily brushed away or peeled off.

I have found that I can obtain substantial results in softening and removing baked enamel paint where the proportions of any one of the three principal agents, namely, alcohol, ammonia and benzol, is reduced to twenty-five per cent. or increased to forty per cent. of the whole quantity of such principal agents with a complementary modification in each case of the percentages of the other two elements, such changes being within the meaning of substantially equal proportions, but the most effective compound for completely removing the baked enamel paint without requiring labor is that first described in which the several elements (excepting the wax) are in equal proportions.

Having thus described my invention, what I claim as new and desire to secure by Letters Patent, is:—

1. The hereindescribed composition for removing baked enamel paint, which consists of substantially equal proportions of alcohol, benzol and ammonia.

2. The hereindescribed composition for removing baked enamel paint, which consists of substantially equal proportions of alcohol, benzol and ammonia of 26 degrees.

3. The hereindescribed composition for removing baked enamel paint, which consists of substantially equal proportions of wood alcohol, benzol and aqua ammonia of 26 degrees.

4. The hereindescribed compound for removing baked enamel paint, which consists of substantially equal parts of alcohol, benzol and ammonia, in combination with a waxy body miscible in the benzol.

5. The hereindescribed compound for removing baked enamel paint, which consists in substantially the following proportions of the following elements, to the gallon of resultant mixture, namely, 40 oz. of ammonia, 40 oz. of benzol, 40 oz. of wood alcohol, and 8 oz. of paraffin wax.

In testimony whereof I affix my signature in presence of a witness.

CLARENCE T. DENEGRE.

Witness:
NOMIE WELSH.